(12) United States Patent
Karst et al.

(10) Patent No.: US 11,926,141 B2
(45) Date of Patent: Mar. 12, 2024

(54) STRUCTURAL MEMBER CONSISTING OF DISSIMILAR POLYMER MATERIALS

(71) Applicant: Altum LLC, Blacklick, OH (US)

(72) Inventors: Greg A. Karst, Columbus, OH (US); Kyle T. Gaines, Blacklick, OH (US); Dominic P. Grandominico, Columbus, OH (US)

(73) Assignee: Altum LLC, Blacklick, OH (US)

( * ) Notice: Subject to any disclaimer, the term of this patent is extended or adjusted under 35 U.S.C. 154(b) by 0 days.

(21) Appl. No.: 18/089,186

(22) Filed: Dec. 27, 2022

(65) Prior Publication Data

US 2023/0128216 A1 Apr. 27, 2023

Related U.S. Application Data

(60) Continuation of application No. 17/354,471, filed on Jun. 22, 2021, now Pat. No. 11,571,877, which is a
(Continued)

(51) Int. Cl.
*B32B 1/00* (2006.01)
*B29C 65/00* (2006.01)
(Continued)

(52) U.S. Cl.
CPC ................ *B32B 7/12* (2013.01); *B29C 66/45* (2013.01); *B29C 66/712* (2013.01);
(Continued)

(58) Field of Classification Search
CPC .... B32B 1/00; B32B 7/00; B32B 7/10; B32B 7/12; B32B 27/00; B32B 27/06; B32B 27/065; B32B 27/08; B32B 27/20; B32B 27/24; B32B 27/30; B32B 27/32; B32B 2419/00; B29C 66/00; B29C 66/40;
(Continued)

(56) References Cited

U.S. PATENT DOCUMENTS 9,636,893 B2 * 5/2017 Markowski ............... B32B 7/12
11,072,147 B1 7/2021 Karst et al.
(Continued)

*Primary Examiner* — Jacob T Minskey
*Assistant Examiner* — Matthew Hoover
(74) *Attorney, Agent, or Firm* — Jason H. Foster; Kremblas & Foster

(57) ABSTRACT

A structural member including a lightweight core, one or more skins, and a crosslinking nanolayer interposed therebetween that results in significant mechanical strength in the structure. The core is a polymer of reduced density by way of included voids, such as an open or closed cell foam, honeycomb, or corrugated structure. The core polymer has a lower density and may have a higher softening or melting temperature than the polymer skin materials. The core may be discontinuous at the interface with the skin such that only a small percentage of the core surface is actually in contact with the skin compared to the overall area of the interface. The skin may be a thermoplastic layer that attaches to the core material. The skin may be a composite material including non-thermoplastic reinforcements. The crosslinking nanolayer is covalently bonded to the surface of the core material and provides molecular compatibility with the skin material.

18 Claims, 11 Drawing Sheets

Related U.S. Application Data division of application No. 17/202,812, filed on Mar. 16, 2021, now Pat. No. 11,072,147.

(51) Int. Cl.
| | |
|---|---|
| *B32B 7/00* | (2019.01) |
| *B32B 7/12* | (2006.01) |
| *B32B 27/00* | (2006.01) |
| *B32B 27/06* | (2006.01) |
| *B32B 27/08* | (2006.01) |
| *B32B 27/24* | (2006.01) |
| *B32B 27/32* | (2006.01) |

(52) U.S. Cl.
CPC .............. *B29C 66/727* (2013.01); *B32B 1/00* (2013.01); *B32B 27/065* (2013.01); *B32B 27/08* (2013.01); *B32B 27/24* (2013.01); *B32B 27/32* (2013.01); *B32B 2419/00* (2013.01)

(58) Field of Classification Search
CPC ......... B29C 66/45; B29C 66/70; B29C 66/71; B29C 66/712; B29C 66/72; B29C 66/727
See application file for complete search history.

(56) References Cited

U.S. PATENT DOCUMENTS

| | | |
|---|---|---|
| 2009/0143524 A1 | 6/2009 | Nakayama et al. |
| 2013/0065019 A1 | 3/2013 | Campeau et al. |
| 2016/0046104 A1* | 2/2016 | Grah ..................... B32B 27/36 |
| | | 428/354 |
| 2016/0096351 A1* | 4/2016 | McDonald, Jr. ........ B32B 37/12 |
| | | 156/60 |
| 2017/0009108 A1 | 1/2017 | Mitchell et al. |

* cited by examiner

STRUCTURAL MEMBER CONSISTING OF DISSIMILAR POLYMER MATERIALS

BACKGROUND OF THE INVENTION

The invention relates generally to polymers joined together to form a structural member, and more specifically to a method of joining dissimilar polymers and the structural member formed by joining dissimilar polymers.

It is well known that polymers may be joined using various technologies. Common methods for joining polymers can be divided into three major categories: mechanical fastening, adhesive and solvent bonding, and welding. The constitution of the components being joined may limit the methods available for joining.

The use of a lightweight core with a discontinuous surface as the basis for a structural member presents a number of challenges. A structural member made of lightweight core and skin materials, such as a sandwich panel, is synergistic in nature in that the combined structure provides mechanical benefits in excess of each of its individual components. The key to realizing its synergistic performance is strong and reliable attachment at the interfaces where the forces can be transferred from one component to another. Establishing and ensuring that an interface is attached properly can be difficult and is critical because only a small percentage of material is actually in contact to form the interface. Additionally, the discontinuous surface of a lightweight core material presents an adhesion challenge. The core surface is subject to outside contamination and even contamination from itself as surface cells break and create dust during handling and storage.

In an example of a sandwich panel structural member consisting of a low-density thermoplastic core covered by a reinforced thermoplastic skin on each side, the thermoplastic skins can be attached to the core by a method such as melting (welding) or adhesive bonding. In a construction intended to be melted together, the core and skin materials typically must be the same or substantially similar thermoplastic materials to ensure compatibility and create a strong interface. For example, a polypropylene honeycomb core is matched with a polypropylene-based skin material. In another example, a polyethylene terephthalate (PET) foam core may be paired with PET-based skin material, as is disclosed in the site found at https://www.avient.com/products/advanced-composites/continuous-fiber-composite-panels/hammerhead-marine-composite-panels. Melting the two similar thermoplastics together provides a high strength bond at the interface. The strong interface is a result of molecular entanglement of two compatible thermoplastics while both are in their melted state. While using the same thermoplastic materials can create the strongest possible interface, it is also challenging to process. Since both materials have substantially the same melting point, the core can easily be overheated and lose its structural consistency as pressure is applied during processing. If the panel is under-heated, the skin and core do not fully melt at the interface, resulting in a lack of sufficient molecular entanglement and a weak bond, subject to delamination of the skin from the core. The net result is a very narrow processing window where a panel is heated enough to consolidate but not so much that it loses its structure under pressure. The processing temperature window for any post-processes, such as thermoforming, using this type of panel or other structural member is similarly narrow. Despite these significant processing challenges, the majority of commercial suppliers currently still match the core and skin materials because it provides the best interface reliability and adhesion assurance. Significant challenges with these materials and this method remain.

Another approach used by other commercial fabricators is to use an adhesive to bond the skin to the core, which enables the use of dissimilar materials in the skin and core. However, an adhesive adds an extra layer in the structure causing increased weight and cost, as well as increased processing complexity. Application of an adhesive layer may require special equipment and extra processing steps during fabrication. An adhesive layer creates additional interfaces that can separate and fail the structure prematurely. Additionally, many thermoplastic materials can be difficult to adhesively bond due to low surface energy. Expensive, complicated, and potentially hazardous surface preparation procedures or primers may be necessary to achieve a reliable bond. Adhesive bonding can also be compromised by contamination or inadequate curing conditions. Even if a reliable bond can be achieved, an adhesive layer makes thermoforming and other post-processing more difficult. The adhesive will not allow the skin-core interface to slip when heated, which significantly restricts the structure's ability to thermoform without buckling. It is also possible that heat from post-processing may degrade an adhesive leading to poor adhesion and delamination.

In another processing approach, the use of a core with a higher melting point than the skin allows for more reliable processing when using lamination or melting the skins to attach to the core. The core remains solid and dimensionally stable while the skin is melted and pressure is added. As the skin solidifies under pressure, a mechanical bond is created at the interface where the core and skin have engaged. While there is no chemical bond or attraction at the interface, this mechanical bond can provide some level of adhesion. However, this type of interface is not reliable and therefore rarely used in commercial products. To increase mechanical interaction between the core and melted skin, high pressures can be used. However, this introduces risk of crushing the core during processing due to its fragile, brittle nature, thus weakening the overall structure. Extra thermoplastic material or a resin-rich surface at the skin-core interface can be employed to create additional mechanical interaction with the core material. However, this increases manufacturing complexity and adds material cost and weight, while providing no chemical compatibility improvement between the core and skin at the molecular level.

The use of acid modified polymer aqueous dispersions combined with crosslinking agents in coatings to improve adhesion of decorative and protective PET films is known in the prior art, such as U.S. Patent Application number 2016/0046104 and U.S. Pat. No. 9,636,893. In these examples of attachment of a decorative or protective PET film to a substrate, the coated film is in essentially full, continuous contact with the substrate. Under these ideal conditions, good adhesion results are reported in 2016/0046104 as peel adhesion strengths of less than 30 and typically not more than about 12 pounds per linear inch. In U.S. Pat. No. 9,636,893, adhesion is quantified by way of an ASTM D3359 crosshatch tape adhesion test. In both references, no structural improvements are measured or suggested.

U.S. Patent Application 2009/0143524 has demonstrated crosslinking coatings as useful for improving compatibility of fiber reinforcements within certain thermoplastic resins. Such coatings can provide mechanical property improvements, however, in this scenario, the polymer is in full, continuous contact with the coated fiber.

Despite a clear market need to improve the mechanical performance of structural members consisting of dissimilar materials to avoid the inherent processing challenges associated with same material structures, the prior art has produced no sufficient solution to the problems that are well known in the prior art.

The use of a crosslinking nanolayer to improve the interface has not been explored or reported. All known examples of prior art involving similar chemistries relate to applications where dissimilar materials are in 100% contact at the interface and this prior art is not analogous to a structural application especially where the interface is not in continuous contact.

SUMMARY OF THE INVENTION

Disclosed herein is a composite structural member configured for bearing a load. The member comprises a polymer core having at least first and second opposing surfaces. A thermoplastic polymer skin attaches to at least the first core surface, and the skin is dissimilar in chemical composition from the core. A crosslinking nanolayer, which includes at least a reactive component and a thermoplastic functional component, is interposed between the skin and the core. The reactive component is covalently bonded to at least the first core surface and the thermoplastic functional component. The thermoplastic functional component molecularly entangles with the skin.

In some embodiments, voids are formed in at least a portion of the core, such as by the core being at least partially a foam or the core being a honeycomb structure. In some embodiments, the first core surface is continuous. In some embodiments, the first core surface is discontinuous.

The skin may be a thermoplastic polyolefin. The skin may be reinforced with thermoplastic structures or non-thermoplastic structures. The skin may be multilayered.

The reactive component may be selected from one of an epoxy, isocyanate, carbodiimide, melamine, and oxazoline functional polymer. The reactive component may be an oxazoline functional acrylic polymer in an aqueous dispersion.

The thermoplastic functional component may be a carboxylic acid functionalized short chain polyolefin polymer, copolymer, or oligomer. The thermoplastic functional component may be an oxidized short chain polyolefin polymer, copolymer or oligomer.

The structural member may be a sandwich panel, which may have at least one edge that is at least partially enclosed, a rod, or an I-beam, among others.

Disclosed herein is a method of fabricating a structural member to bear a load. The method comprises applying a crosslinking nanolayer coating, including at least a reactive component and a thermoplastic functional component, to at least one surface of a polymer core. The method further comprises covalently bonding the reactive component to the at least one surface of the core and to the thermoplastic functional component. In some embodiments, the method further comprises disposing a thermoplastic polymer skin, which is dissimilar in chemical composition from the core, in contact with the crosslinking nanolayer coating. In some embodiments, the method further comprises heating the skin to at least about a skin melting temperature, whereby the thermoplastic functional component entangles with the molecules of the skin.

Some embodiments include the step of applying pressure to the skin in a direction toward the core to enhance contact between the skin and the at least one surface of the core. Some embodiments include a step of cooling at least the skin below the melting temperature of the skin. In some embodiments, there is a step of reshaping the structural member in a secondary process.

Disclosed herein is a polymer core having first and second opposed surfaces. At least the first core surface is coated with a crosslinking nanolayer including a reactive component and a thermoplastic functional component. The reactive component is covalently bonded to the first core surface and the thermoplastic functional component. The thermoplastic functional component is configured for molecularly entangling with a thermoplastic polymer skin that is dissimilar in chemical composition from the core and is placed in contact with the first core surface. In some embodiments, voids are formed in at least a portion of the core.

Disclosed herein is a structural member consisting of a lightweight core, one or more skins, and a crosslinking nanolayer interposed between the core and each skin that results in significant mechanical improvement of the structural member. The core may comprise a rigid polymer of reduced density by way of included voids, such as an open or closed cell foam, honeycomb, or corrugated structure. The core is preferably made of a material that may have a lower density than the material of the polymer skins. The core may be discontinuous at the interface with the skin such that only a small percentage of the core's material in the plane or other shape of contact is actually in contact with each skin compared to the overall area of the interface. The skin is the outer layer that is attached to the core. The skin material is thermoplastic-based, dissimilar from the core material, and may be a composite material that includes reinforcements. The crosslinking nanolayer is covalently bonded to the discontinuous surface of the core material and provides molecular compatibility with the skin material.

The material of the core is polymeric and may be thermoplastic or thermoset and may have a higher softening or melting temperature than the material of which the skin is made. The core material may be from the group that includes polyvinyl chloride, polycarbonate, polyamide, polyimide, polyetherimide, polysulfone, polyaryletherketone, polybutylene terephthalate, polyethylene terephthalate, polyoxymethylene, polymethyl methacrylate, thermoplastic polyurethane, polystyrene, acrylonitrile butadiene styrene, styrene acrylonitrile, or others. The core may have low density because of included voids, such as cells, that impart to at least a portion of the core a foam or honeycomb structure. The surface of the core may be discontinuous and not in full contact with the skin material at the interface.

The skin or skins are made of a polymer that is thermoplastic and is dissimilar from the polymer of the core. The thermoplastic skin may be made of a polyolefin-based material. The softening or melting temperature of the skin material may be lower than the softening or melting temperature of the core material. The thermoplastic skins may include a reinforcement such as fiberglass, carbon fiber, aramid fiber, or others. The reinforcements may be continuous or discontinuous. The skin may consist of multiple layers that may be laminated or otherwise consolidated together. The overall skin surface is essentially continuous but may include some holes or cutouts as part of the structural member design.

The crosslinking nanolayer may be applied to the outer surface(s) of the core prior to the fabrication of the structural member. The nanolayer comprises a reactive component and a thermoplastic functional component. The crosslinking nanolayer covalently bonds to the core and creates a surface that is molecularly compatible with the material of the skin(s), as described in detail herein. The reactive component covalently bonds to both the core material and the functional component. The reactive component may consist of an epoxy, isocyanate, carbodiimide, melamine, or an oxazoline functional polymer which may be an acrylic polymer. The thermoplastic functional component consists of a modified polymer, copolymer, or oligomer that chemically bonds to the reactive component and provides molecular compatibility with the skin material. The thermoplastic functional component is the same polymer, or substantially similar to, the polymer of the skin material. The reactive and functional components may be combined in a solvent or aqueous mixture where they react to form a stable dispersion. The crosslinking nanolayer can be applied to the core surface or surfaces by spraying, dipping, rolling, or other coating method. After application, the dispersion is allowed to dry at ambient or elevated temperature, leaving the crosslinking nanolayer remaining on the surface.

The fabrication of a structural member described in this disclosure may involve a core, one or more skins, and a crosslinking nanolayer. The crosslinking nanolayer comprises a reactive component and a thermoplastic functional component which react and covalently bond together. The crosslinking nanolayer may be first applied to the core's outer surface, which will be at the interface of the core and the skin, to facilitate improved adhesion. The crosslinking nanolayer may be dried to remove or reduce the solvent and/or any water. Next, the thermoplastic skin and the core may be heated to a temperature at or above the melting point of the material of which the skin is made and below the melting point of the material of which the core is made. After the components are heated and the skin is placed adjacent the surface of the core to which it will be mounted, pressure may be applied to the melted skin material. This can be by suitable means, such as a press or laminator, to create and enhance contact between the skin and the surface of the core to which the crosslinking nanolayer has been applied. The amount of pressure should be limited to a value less than the compressive strength of the core material. At the elevated temperature, the crosslinking nanolayer chemically reacts with the polymer of the core material and forms a covalent bond, and the thermoplastic functional component of the crosslinking nanolayer entangles with the molecules of the melted thermoplastic skin. After the structural member is cooled below the melting temperature of the skin material, the thermoplastic functional components of the nanolayer remain entangled with the polymer molecules of the skin and the nanolayer becomes indistinguishable from the thermoplastic skin.

The lack of previous consideration for this type of approach can be easily explained by the potential discontinuous nature of the core surface and subsequent discontinuity of the crosslinking nanolayer itself. The prior art is focused on non-structural applications and cases where the interface of the dissimilar materials is in continuous contact. With as little as 5% or less of the core surface actually in contact with the skin across the bonded area, there would be no reasonable expectation that application of a crosslinking nanolayer would result in significant improvement in mechanical properties in the overall structure. The continuous, non-structural interfaces noted in prior art target significantly different performance requirements for their respective markets and fields of use compared to this invention and should not be considered analogous.

Figure 1:
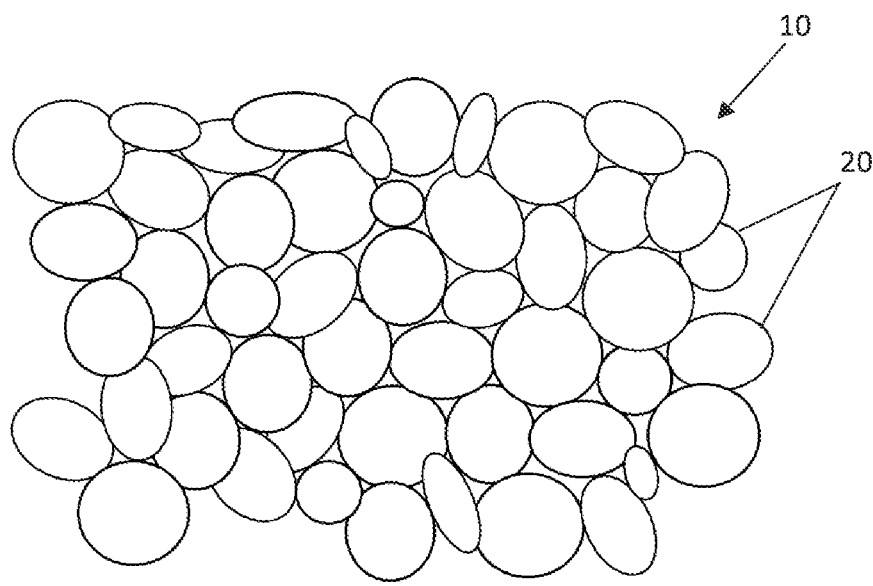
FIG. 1 is a schematic magnified side view illustrating a PET foam core with a closed-cell foam cellular structure.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION

A structural member is disclosed herein that includes a core, one or more skins, and a crosslinking nanolayer interposed therebetween. A method of forming the structural member is also disclosed. The combination of the components assembled according to the method results in strong attachment of the components to form the final structure, which may be used in many circumstances. Some examples includes reinforcement members, beams, panels, and any other structural member in which strength and weight are important characteristics, along with long-term integrity of the components of the structural member.

The core may be made of a material that is a rigid polymer. The density of the core may be lower than the density of the polymer in its typical form. Density reduction may be by way of included voids, such as an open or closed cell foam, a honeycomb configuration, corrugated configuration, or a manufactured configuration such as an additive or subtractive manufacturing method, all of which reduce the density due to the inclusion of voids and passages. Other forms of density reduction are contemplated. The core consists of both the polymer and the voids. The core may be made in many shapes, but some that are typical are plates, sheets, bars, beams, rods and cylinders. Irregular and random shapes are also contemplated, but are not described in detail herein.

The skin may be made of a thermoplastic layer that is in the shape of a sheet or strip. This shape enables the skin to conform more readily to the surface to which it is attached, or to be shaped by a mold or platen that presses the skin as described herein. The skin is eventually attached to one or more surfaces of the core, as described herein, and therefore skins are typically much thinner in one dimension than in the other two, although skins are contemplated that are much thinner in two dimensions than in the third, such as a string. All skins are preferably thermoplastic-based and may include a composite with reinforcements, such as fibers of a second material that are not thermoplastic (e.g., glass, carbon, etc.), in a thermoplastic matrix.

The core preferably has a lower density than the thermoplastic skins due to the density of the core material or due to the constitution of the core, such as having included voids, and may have a higher softening or melting temperature than the thermoplastic skins. The core may also be discontinuous at the interface with the skin or skins, and "discontinuous" is defined as having only a small percentage of the outer surface of the core in contact with the contacting surface of the skin or skins compared to the overall area of the interface between the core and the skin. This is described in more detail below.

A crosslinking nanolayer is covalently bonded to the surface of the core and provides molecular compatibility with the skin or skins that are placed in contact with the core surface(s). The nanolayer is preferably a fluent material in the form of a fine powder, liquid or semi-liquid, and is applied to the surface of the core in a conventional manner. If any solvent or water remains in the nanolayer after being applied, the water or solvent is removed, such as by evaporation or a chemical reaction, and then the nanolayer forms the core's outer surface, or at least some portion of the core's outer surface.

FIG. 1 shows a schematic view of an example of the cellular structure of a polymer foam that may be used as the core 10. The cells 20 with void inclusions create a cellular structure that results in a core 10 with lower density than the polymer in its non-cellular configuration. Thus, the core with voids has lower density than the core's polymer without voids. The bulk of the core is preferably closed cell, meaning the cells 20 are fully enclosed and their voids are not interconnected with other cells. The voids within the core cells 20 that lower the density may also be engineered, as with the example of a honeycomb structure, which is not illustrated but is well known (see, e.g., https://www.plas-core.com/honeycomb/honeycomb-panels/). FIG. 1 shows schematically what the core may look like when viewed on the surface or in section.

Figure 2A:
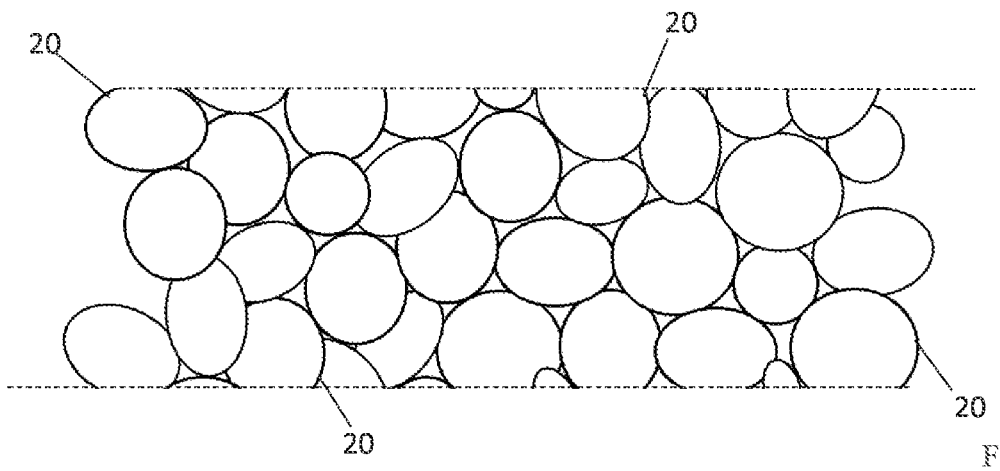
FIG. 2A is a schematic magnified side view illustrating a PET foam core that has been cut to consistent thickness with the discontinuous surface generated by a process in accordance with the invention.
Figure 2B:
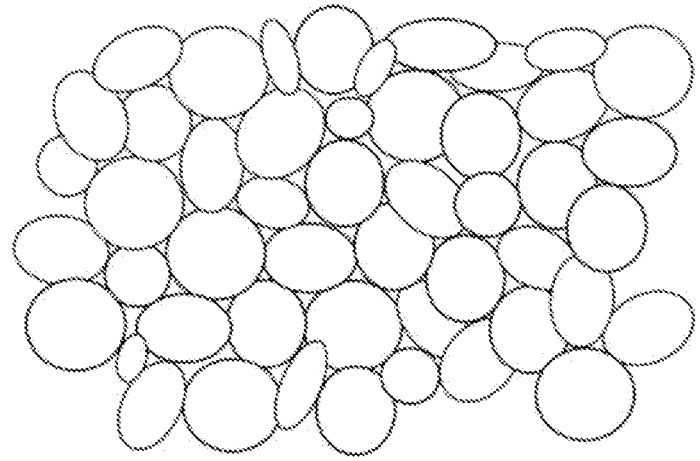
FIG. 2B is a schematic magnified top view illustrating the PET foam core of FIG. 2A.

FIG. 2A schematically illustrates a foam core that has been cut to an even thickness, and shows a side view with the top and bottom (in the orientation of FIG. 1) surfaces being generally planar, but also having only a small amount of surface area along the planar surface. At the surface where the foam has been cut, the cellular structure is jagged and discontinuous, because cells 20 have been cut along planes, which are shown in FIG. 2A by dashed lines. A top view of the top surface of the core of FIG. 2A is shown in FIG. 2B where the curved lines are the surfaces that are arranged generally along the plane and may contact a skin. When a skin is applied to the discontinuous surface of the core 10, an interface is created where the continuous skin surface contacts the discontinuous core surface. Because of the discontinuous nature of the core material, the amount of the core's interfacial surface area that is in contact with the skin is a small fraction of the overall area of the interface, as shown in FIG. 2B. The overall area of the interface is defined as all of the area within the outer boundaries of the discontinuous core surfaces that contact the skin(s), which in FIG. 2B is all of the area within the outer boundary of FIG. 2B. While the small amount of the discontinuous surface at the plane contacts the skin, a large fraction of the overall area is not directly contacting the skin and is not adhered to the skin. In another embodiment, the core material may be a honeycomb structure, where the surface is also discontinuous and the contact area is low relative to the overall surface area of the interface. In another embodiment, the core surface may be semi-continuous or continuous, while still being lower in density than its base polymer, by way of internal voids or inclusions. A continuous core surface is where all, or essentially all, of the core surface in the overall area of the interface contacts all or essentially all of the skin surface within the overall area of the interface. A discontinuous surface can be modified to a continuous surface by local heating and mechanical deformation.

Figure 3:
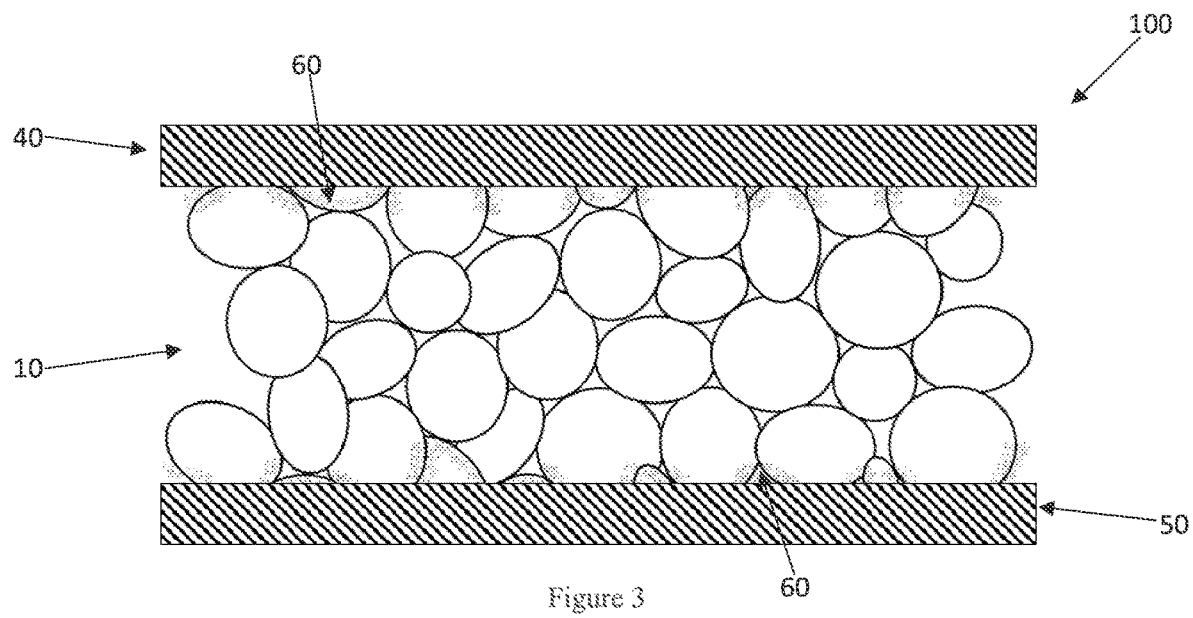
FIG. 3 is a schematic magnified side view illustrating a sandwich panel with the components of the structural member disclosed.

In FIG. 3, the components of the structural member of this invention are illustrated in the form of a foam core sandwich panel structure 100. At the top and bottom of FIG. 3 are the skins 40 and 50 made of preferred thermoplastic materials. In between the skins 40 and 50 is the core 10 made of a preferred core material, which may be PET. At the interfaces of the core 10 and the skins 40 and 50 is the crosslinking nanolayer, which is shown for illustration purposes with reference numeral 60 pointing to the shading, but is not actually visible in the structure after fabrication, whether using the naked eye or by conventional magnification.

The core 10 consists of a material that is thermoplastic or thermoset polymer. The preferred material includes voids, such that the density of the core is substantially lower than the density of the base polymer from which it is comprised. A density that is "substantially" lower is about 50% of the density of the base polymer or lower. The core density may be much lower than 50% of the density of the base polymer, such as approximately 2% to 25% of the density of the base polymer. Examples of densities of the core relative to the base polymer include 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, and 40%.

The voids of the core 10 may be inherent in the material, such as irregularly-sized and/or shaped cells or pores of a foam, or they may be engineered to be of regular size and shape by forming strands of non-foamed material with voids therebetween, such as the hollow cells of a honeycomb structure. The included voids may create a core surface to which a skin can attach that is effectively discontinuous in its attachment to the skin or skins, meaning only a fraction of the core surface is in contact with the skin across the overall interface area. Typical core density may be equal to or less than 50% of the density of the base polymer of the core. If such a core is discontinuous at its surface, the corresponding contact area between the core and skin would similarly be equal to or less than 50% of the total interfacial area. If a core surface is considered continuous, the contact area of the interface may be essentially 100% of the total interfacial area, which results in essentially 100% of the surface of the skin contacting essentially 100% of the surface of the core. If the contact area of the interface is less than 100% of the interfacial area, the core surface may be considered to be discontinuous. The core surface may also be considered discontinuous if the contact area of the interface is less than 98%, 95%, 90%, 85%, 80%, 75%, 70%, 65%, 60%, 55%, or 50%.

If the voids of the core are evenly distributed, the density of the core and degree of surface continuity will be approximately equal. For example, a core that is a PET foam having a density of 0.15 grams per cubic centimeter is equivalent to approximately 11% of the density of the PET polymer in its natural form, which is 1.38 grams per cubic centimeter. If this core is cut to be flat on the major surfaces, the amount of contact area between the core and the skin will be approximately equal to the density fraction of 11%. However, it is possible that this core may undergo a treatment to alter the surface continuity to be different and independent from the density of the core. For example, the core surface may be heated to a temperature above its softening or melting temperature by a hot plate and flattened to increase surface continuity. This embodiment is an example of a core that can have a density that does not correlate to its surface continuity. In other embodiments, the core density and surface continuity may not be the same, for example if the core has a continuous layer applied or attached to its surface, such as by extrusion or another method, thereby creating a continuous surface on a low density core with a portion, or portions, of the core spaced from the surface including voids.

The polymer of the core may have a sufficiently high softening or melting temperature, such that when the molten skin material is attached to the core material and pressure is added, the core does not collapse. The core may comprise a thermoplastic polymer such as polyvinyl chloride, polycarbonate, polyamide, polyimide, polyetherimide, polysulfone, polyaryletherketone, polybutylene terephthalate, polyethylene terephthalate, polyoxymethylene, polymethyl methacrylate, thermoplastic polyurethane, polystyrene, acrylonitrile butadiene styrene, styrene acrylonitrile, and other thermoplastic polymers that may form a suitable core. A thermoplastic core may comprise a virgin polymer material or a thermoplastic that has been previously processed and recycled. The core may comprise a thermoset polymer such as an aramid, polyurethane, polyisocyanurate, polymethacrylimide, polyester, epoxy, and other thermoset polymers that may form a suitable core. The polymer of the core may include a reinforcing or filler material such as fiberglass, carbon fiber, glass beads, glass bubbles, talc, or other such material.

The skin comprises a thermoplastic polymer that is dissimilar from the polymer of the core. Dissimilar may mean that the materials are immiscible, chemically incompatible, or may have different surface energies, such that a structural bond would not be expected at their interface. The melting temperature of the thermoplastic skin is preferably lower than the melting or softening temperature of the core in some embodiments. Under these circumstances, heating both skin and core components to a temperature above the melting temperature of the skin and below the melting or softening temperature of the core permits the molten skin to be attached to the core and pressure applied, thereby achieving adequate entanglement of the skin with the nanolayer coated core surface without collapsing, crushing, or damaging the core. In another embodiment, the skin material may have a higher melting temperature than the core material. In this scenario, an alternate heating method may be required for consolidation. In another embodiment, the skin or skins may be heated independently and attached to a core that is at a lower temperature.

The thermoplastic skins may include a reinforcement such as fiberglass, carbon fiber, aramid fiber or others. The one or more reinforcements may be continuous or discontinuous within the skin. The skin may consist of a single layer or multiple layers, and in one contemplated embodiment there are multiple layers, some layers of reinforced thermoplastic material and other layers of unreinforced thermoplastic material. The skin layers may be consolidated prior to the fabrication of the structural member or may be consolidated during its fabrication. The skin surface overall is essentially continuous but may include limited holes, cutouts, ribs, bosses, or other features as part of the structural member design.

In another embodiment, the structural member that is made up of the skin(s) attached to the core may include multiple different skin materials, each of which is made of a different thermoplastic polymer and may also be joined by way of a crosslinking nanolayer. The use of multiple skin materials may allow for another level of optimization in structural member design, enabling more efficient and lightweight structures.

The crosslinking nanolayer comprises a reactive component and a thermoplastic functional component. The purpose of the reactive component is to covalently bond the thermoplastic functional component to the surface of the core material that the nanolayer contacts. The purpose of the thermoplastic functional component is to molecularly entangle with the molten thermoplastic polymer chains of the skin during attachment of the skin to a nanolayer-coated surface of the core.

The reactive component of the crosslinking nanolayer performs the crosslinking function of the nanolayer. The reactive component is selected to be able to react and covalently bond to both the base polymer of the core and the thermoplastic functional component of the crosslinking nanolayer formulation. The reactive component may be based on a number of different common crosslinker functional groups which may include, but is not limited to, epoxy, isocyanate, carbodiimide, melamine, or oxazoline. The reactive component may consist of a polymer, copolymer, or oligomer containing one or more crosslinker functional groups. The reactive component may be suspended in a solvent such as methanol, acetone, methyl ethyl ketone, or water.

The thermoplastic functional component comprises a short chain polymer, copolymer, or oligomer molecule of the same or substantially similar thermoplastic polymer as the skin material, such that the thermoplastic functional component is miscible with the skin material when the skin material is in a molten state, such as when the skin is above its melting temperature during attachment to the core. Additionally, the thermoplastic functional component is compatible with the reactive component of the crosslinking nanolayer such that a covalent bond can be formed between the two components.

In one embodiment, the skin material may be glass-reinforced polypropylene. In this case, an appropriate thermoplastic functional component of the crosslinking nanolayer may be a carboxylic acid modified short-chain polypropylene, such as a maleic anhydride modified polypropylene. In this case, the maleic anhydride functional group is able to covalently bond with the reactive component of the crosslinking nanolayer. Similarly, an oxidized short-chain polyethylene may be used as the thermoplastic functional component when the skin material comprises a polyethylene-based thermoplastic. The thermoplastic functional component may be suspended in a solvent such as methanol, acetone, methyl ethyl ketone, or water. The thermoplastic functional component may also be in the form of an emulsion.

The crosslinking nanolayer may be created by combining the reactive component and the thermoplastic functional component in a carrier. The carrier may be a solvent that is compatible with both the components. The amount of reactive component included in the dispersion may be in excess of the amount of the thermoplastic functional component in a reactive equivalent ratio that may be between about 20:1 and 1:1, preferably approximately 2:1. Other ratios may also provide satisfactory results depending on the details of the specific components selected. The components may slowly begin to react with each other upon combination. The excess of reactive component will ensure that sufficient reactivity remains when the crosslinking nanolayer is applied to the core, such that the reactive component will covalently bond to the core material. In another embodiment, the crosslinking nanolayer components may not be combined prior to application. For example, the reactive component may be applied alone to the core and the thermoplastic functional component may be applied alone to the skin, where the two components of the crosslinking nanolayer do not combine until fabrication of the structural member. Similarly, the thermoplastic functional component may be dispersed within the skin material itself during formation of the skin, and then bonds with a reactive component, which was previously applied to the core, when the skin and core are placed in contact during fabrication. In another embodiment, the crosslinking nanolayer may be applied to the skin side of the interface rather than the core. In another embodiment, the components of the crosslinking nanolayer may be applied to either the core or skin sequentially rather than having been previously combined within a carrier. In another embodiment, the components of the crosslinking nanolayer may have already been combined at an earlier time by a third party.

Figure 4:
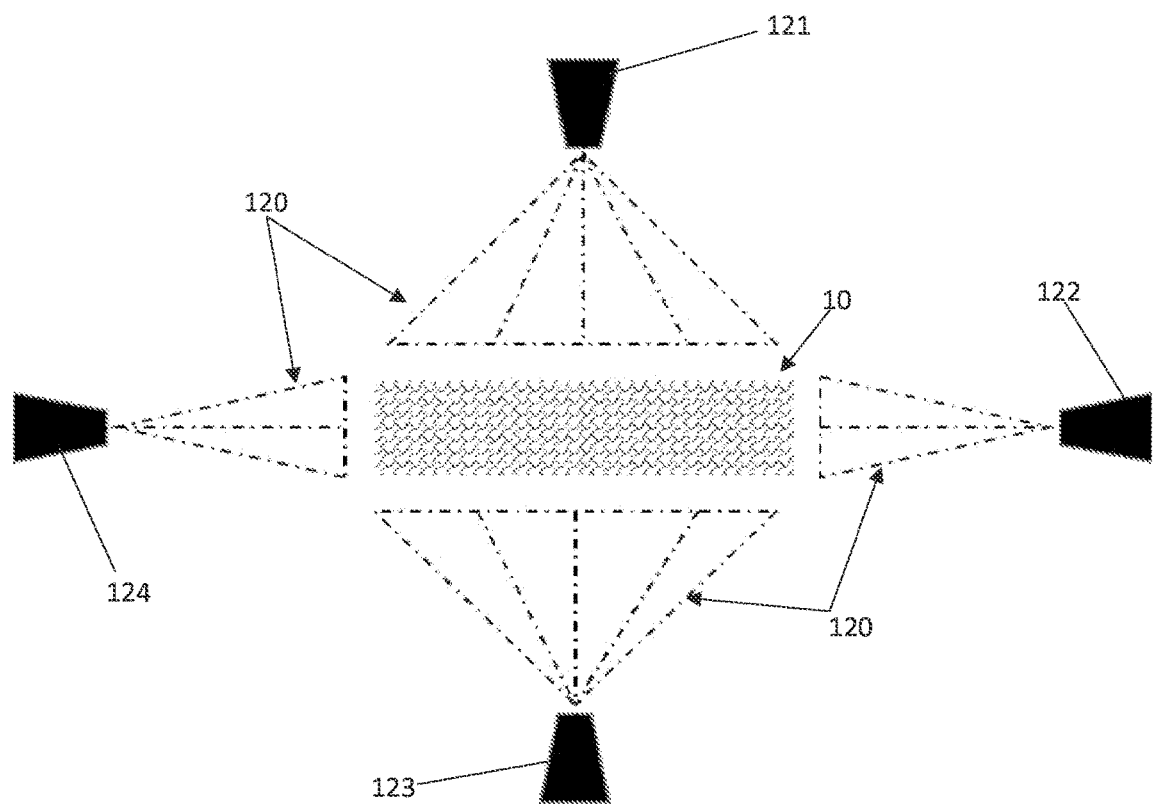
FIG. 4 is a schematic view illustrating a core material being sprayed with a dispersion that will form the crosslinking nanolayer.

FIG. 4 illustrates an example of a mechanism that may be used in an application method that can be used to apply the crosslinking nanolayer to the core 10. In this example an aqueous dispersion 120 containing the crosslinking nanolayer components is sprayed onto all outer surfaces of the core 10 using conventional spray nozzles 121, 122, 123 and 124. The sprayed dispersion 120 may be a mist or an aerosol. In other embodiments, the dispersion can be applied to the core material by dipping, brushing, roll coating, or other methods that are known by a person having ordinary skill in the art. In another embodiment, the components of the crosslinking nanolayer are not dispersed in a carrier but are applied directly to the core and/or skin surfaces in the form of a dry powder, gel, or some other form.

Figure 5:
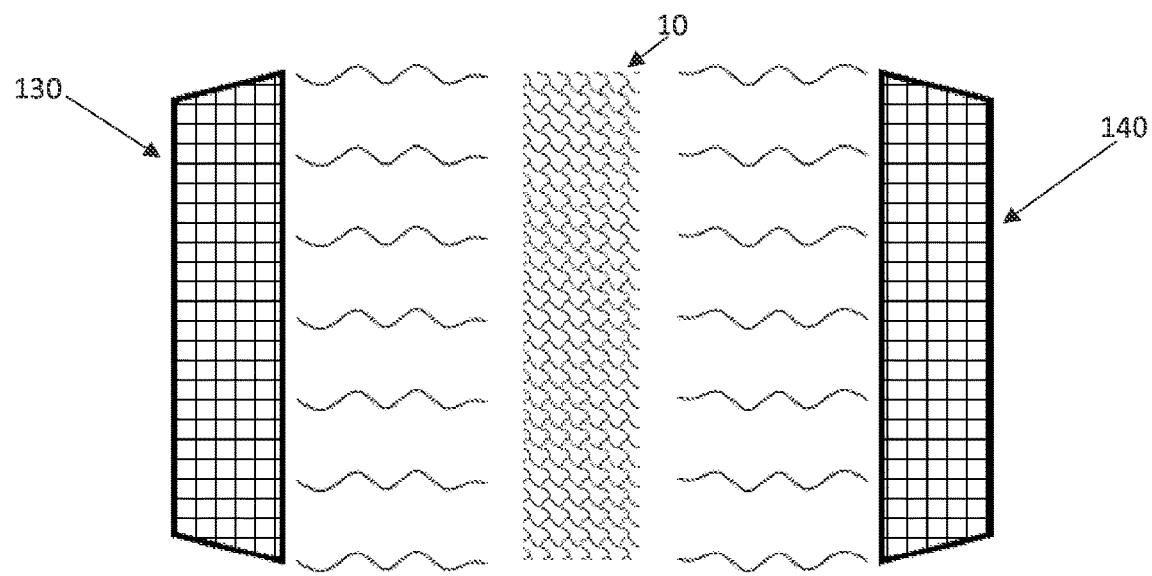
FIG. 5 is a schematic view illustrating a core material being dried at elevated temperature after application of the crosslinking nanolayer.

After the crosslinking nanolayer dispersion is applied, the solvent carrier is allowed to dry off by evaporation or chemical reaction. This can occur at ambient conditions or the core or other structure can be heated and/or have air or other gas flowed over it to accelerate the drying process. In FIG. 5, the core 10 is shown being heated by radiant heaters 130 and 140 as an example of a method for accelerating the drying process. Preferably, the drying temperature should be controlled to stay below the softening temperature of the core material so the core does not become distorted or deformed. In addition to accelerating evaporation of the carrier, raising the core to an elevated temperature also accelerates the crosslinking reaction that chemically bonds the nanolayer to the core material. In another embodiment, the crosslinking reaction may be initiated by some means other than heat, such as ultraviolet radiation, electron beam radiation, or some other initiation mechanism. This crosslinking reaction may also occur during the attachment of the skin when the skin is in its melted state. However, if the nanolayer is applied but not reacted with the core surface at elevated temperature, the nanolayer could be removed or contaminated before the skin material is attached to the core at a later time. In addition, the crosslinking nanolayer may be applied to a core at the time and location of the core's manufacture, or by any third party, prior to the fabrication of the structural member. In a preferred embodiment, the crosslinking nanolayer is applied and promptly dried and reacted at elevated temperature, such as 120° C. to 150° C., for a time sufficient to ensure complete drying.

After the crosslinking nanolayer has been chemically bonded to the core, the effective surface energy of the core is altered. The "effective surface energy" of the core is the surface energy encountered by a skin applied to the coated surface of the core after application and chemical bonding of the nanolayer to the core. The "effective surface energy" differs from the actual surface energy of the core, which actual surface energy is measured prior to application and chemical bonding of the nanolayer to the core. The effective surface energy of the core may be lower or higher than the actual surface energy after the application and chemical bonding of the crosslinking nanolayer. The effective surface energy of the core after application and chemical bonding of the crosslinking nanolayer may then substantially match the surface energy of the skin material. Matching surface energies by way of the crosslinking nanolayer further enhances compatibility between the skin and core.

Figure 6:
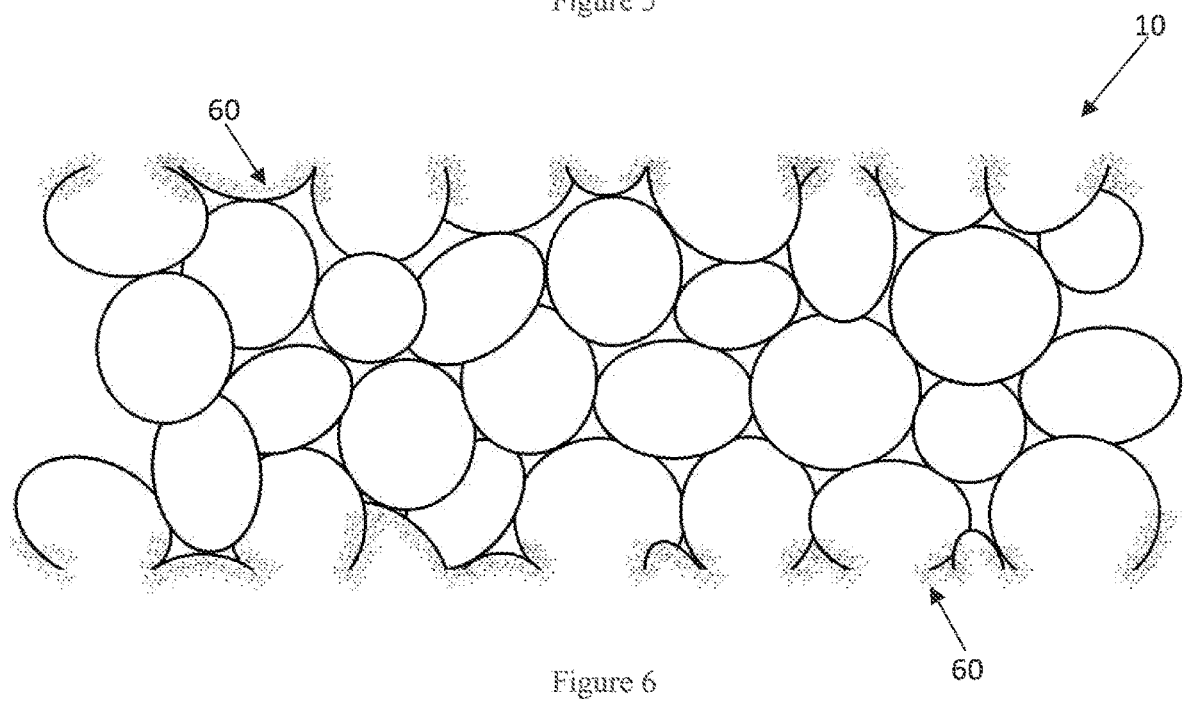
FIG. 6 is a schematic magnified view illustrating the core material after the crosslinking nanolayer has been applied.

FIG. 6 is an enlarged view of the surface of a foam core 10 after the crosslinking nanolayer 60 has been applied. The nanolayer 60 has covered the discontinuous surfaces of the core material and some of the cell walls extending toward the center of the core 10, despite the fact that the skins will only attach to the edges of most cells along the planar surface of the core 10. Of course, in curved or irregular cores, the skins will attach to curved surfaces, and still only to the edges of the cells. The skins bridge over the deeper voids of the cut cells at the core surface, as evident in FIG. 3. The contact area of the interface is low relative to the overall interfacial area, typically contacting only a few percent to 10 or 20 percent of the overall interfacial area. Similarly, if the core is a honeycomb configuration, the skin bridges over the openings of the core and only attaches along the plane or curve where the edges of the cells contact the skin.

Figure 7:
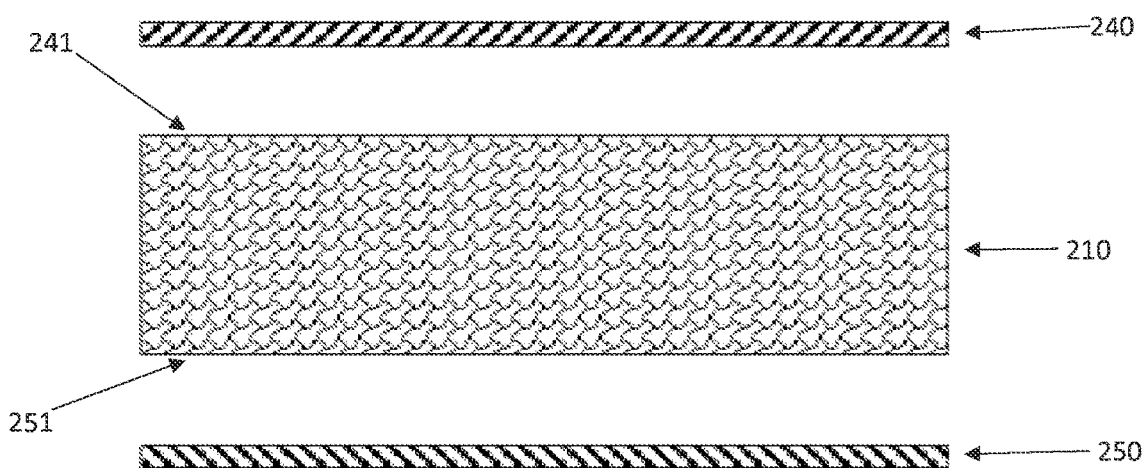
FIG. 7 is a side view illustrating the components of a structural member prior to assembly that will be a sandwich panel. The crosslinking nanolayer has been applied to the core material but is not visible.

FIG. 7 is an embodiment of a structural member consisting of a core 210 and two skins 240 and 250 of equal area. FIG. 7 shows the core 210 after the crosslinking nanolayer has been applied, dried, and crosslinked with the core material surface. The nanolayer is not visible, so it is not shown in FIG. 7. Because the skins 240 and 250 are equal in size and have a length similar to the core, this embodiment will result in a sandwich panel having the core 210 exposed at the edges. In this embodiment, any of the edges of the core 210 that will have no skin attached do not need to have the crosslinking nanolayer applied thereto since no skin material will be attached to those edges.

Figure 8:
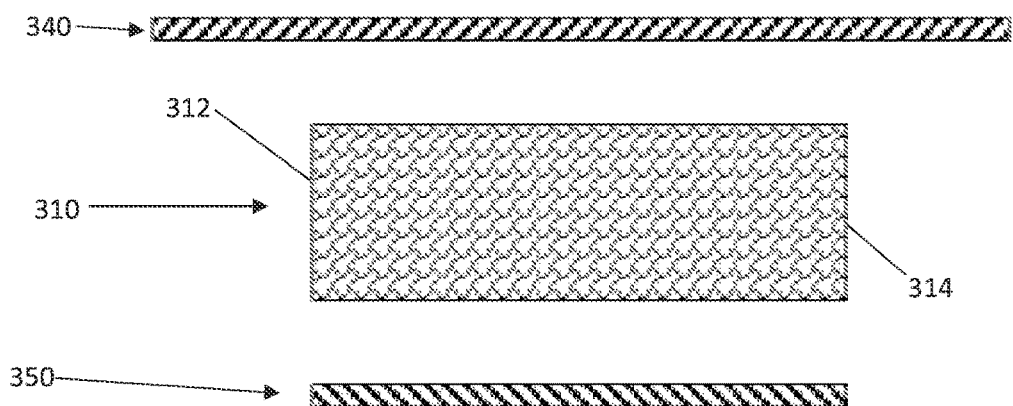
FIG. 8 is a side view illustrating the components of a structural member prior to assembly that will be an enclosed sandwich panel. The extra skin material will enclose the edges of the structure. The crosslinking nanolayer has been applied to all surfaces of the core material but is not visible.

In FIG. 8, another embodiment of a structural member is illustrated consisting of a core 310 and two skins 340 and 350. In this embodiment, the area of the core 310 and one skin 350 are equal, however the area of the second skin 340 is larger than the core 310. The second skin 340 area is larger than the core 310 by approximately twice the thickness of the core 310. During fabrication, the larger skin 340 may wrap around the opposite edges 312 and 314 of the core 310 creating a sandwich panel that is enclosed on the edges. In this embodiment, the crosslinking nanolayer is applied to the core 310 on all sides because the skins 340 and 350 will be in contact on all sides of the core 310 when completed as a finished structural panel.

In some embodiments, the core is partially enclosed by skins, having one or more major surfaces and edges of the core covered, but some surfaces and/or edges remain uncovered by skins. In these embodiments, one skin may have extra skin material to accommodate being wrapped around and cover the edge of the panel that will be enclosed. In other embodiments, one or more surfaces or edges of the panel may be only partially enclosed. In other embodiments, the edges may be enclosed at a different time than the initial fabrication of the structural member using a separate skin material not integrally connected to the initial skins. It is contemplated to cover the edges or sides of a core with skin that is not bent from a skin that is larger than the major surface (side) of a core, but with each side or edge that is covered being covered by a skin cut to the correct size for that side or edge. The skin at the edge may contact the skin at the surface while both are melted to establish continuity of the two skins. The interface of the two separate skins becomes welded together, and the skins surrounding the core can be essentially seamless creating a fully enclosed structural member.

Figure 9:
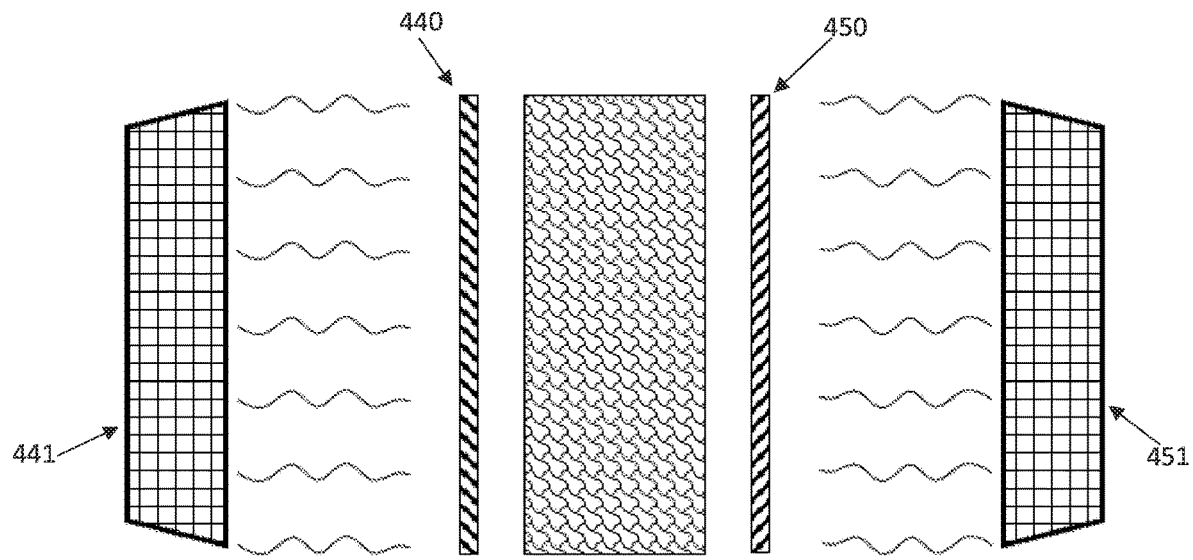
FIG. 9 is a schematic side view illustrating a structural member that will be a sandwich panel being heated by radiant heaters during assembly to melt the skin materials. The crosslinking nanolayer has been applied to all surfaces of the core material but is not visible.
Figure 10:
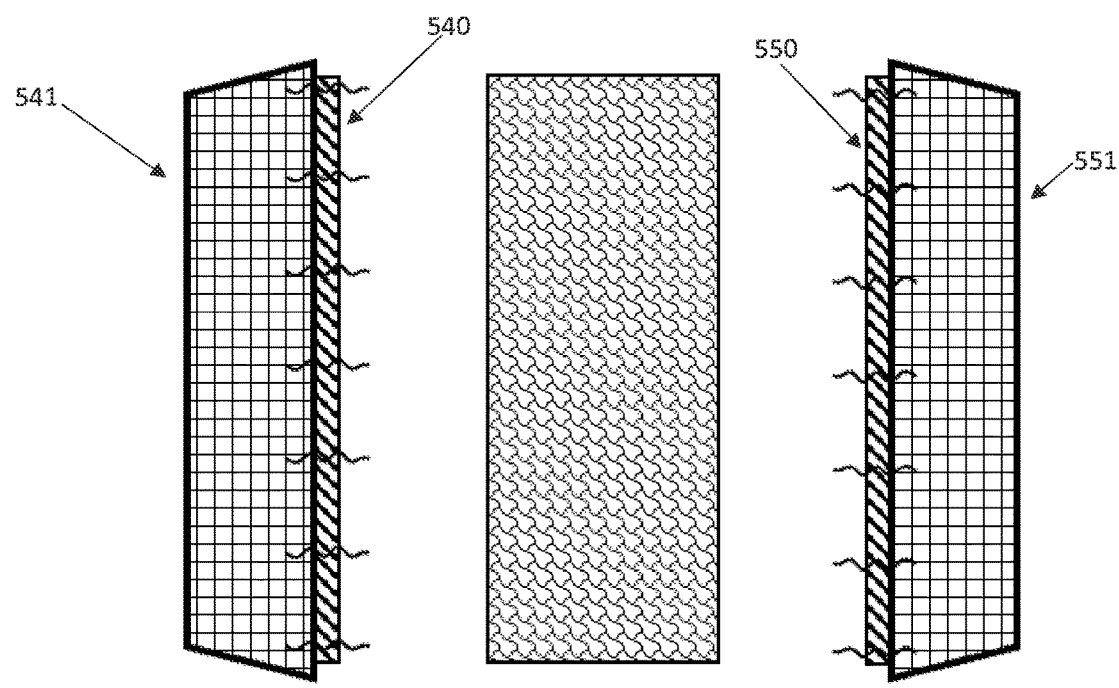
FIG. 10 is a schematic side view illustrating a structural member that will be a sandwich panel being heated by conductive heaters during assembly to melt the skin materials. The crosslinking nanolayer has been applied to all surfaces of the core material but is not visible.

In one embodiment, the skin materials may be heated to a temperature above their melting temperature to be attached to a core that has a crosslinking nanolayer applied to its awaiting surface to form a sandwich panel. The skins may comprise multiple layers of material that are consolidated either before or during the fabrication of the structural member. The skins 440 and 450 may be heated using radiant heaters 441 and 451 as illustrated in FIG. 9. In another embodiment, the skins 540 and 550 may be heated using conduction heaters 541 and 551 as illustrated in FIG. 10. Other heating methods may also be employed to elevate the temperature of the skins to above their melting temperature so they can be attached to the core material. Conduction heating of the skins is typically preferred as it is fast and efficient.

Figure 11:
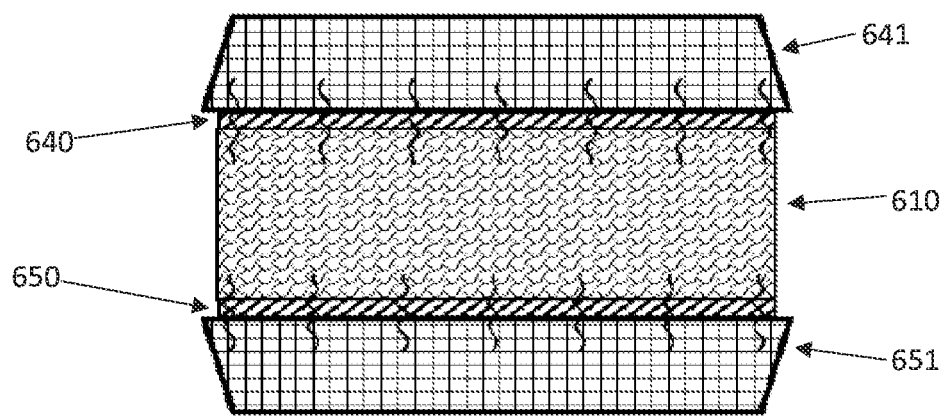
FIG. 11 is a schematic side view illustrating a structural member that will be a sandwich panel that was heated during assembly by conductive heaters to melt the skin materials. Pressure is shown as being applied to attach the skins to the core. The crosslinking nanolayer has been applied to all surfaces of the core material but is not visible.
Figure 12:
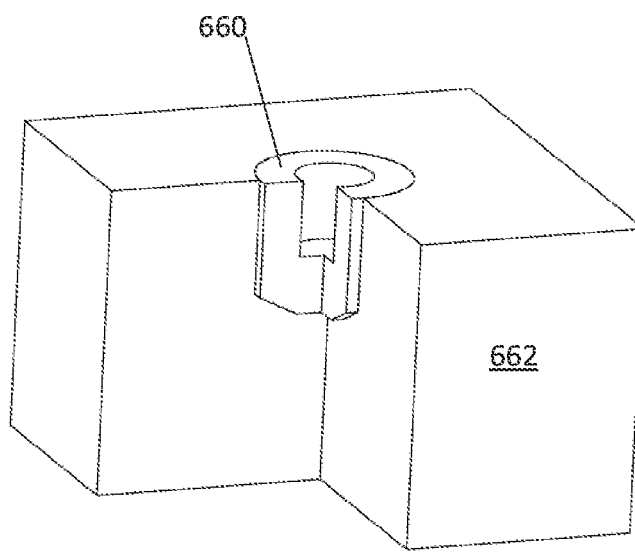
FIG. 12 is a schematic cutaway view in perspective illustrating a nylon insert core overmolded with a polypropylene skin.

After the skin materials are heated to a temperature above their melting temperature, pressure is applied to the skins of the assembly in directions toward the core surface being contacted by the skins until the skins solidify at a temperature below the melting temperature of the skin materials. In FIG. 11, pressure is applied to two skins 640 and 650 in contact with a core 610 by two platens 641 and 651 of a press during a batch process in order to force the skins 640 and 650 into contact with the discontinuous opposing surfaces of the core 610. The direction of the pressure is from the platens 641 and 651 toward the core 610. In other embodiments, the pressure may be applied by way of a vacuum system or positive pressure such as an autoclave or within a cavity of an injection molding press. FIG. 12 illustrates an embodiment of an injection molding application. The crosslinking nanolayer may be applied to an insert core 660 or substrate that is followed by an overmolding step to form a skin 662 within the cavity of an injection molding machine or press. This embodiment may include the use of a threaded insert core consisting of a high temperature polymer treated with the crosslinking nanolayer to improve adhesion to a lower melting temperature thermoplastic skin applied to the surface of the core with inwardly-directed pressure. The insert core 660 may be held in place within the cavity of the die while the lower melting temperature thermoplastic skin 662 is injected into the cavity, surrounding and molecularly entangling with the crosslinking nanolayer on the surface of the insert core 660. The crosslinking nanolayer may improve the adhesion between the insert core 660 or substrate and the overmolded thermoplastic skin 662.

Figure 13:
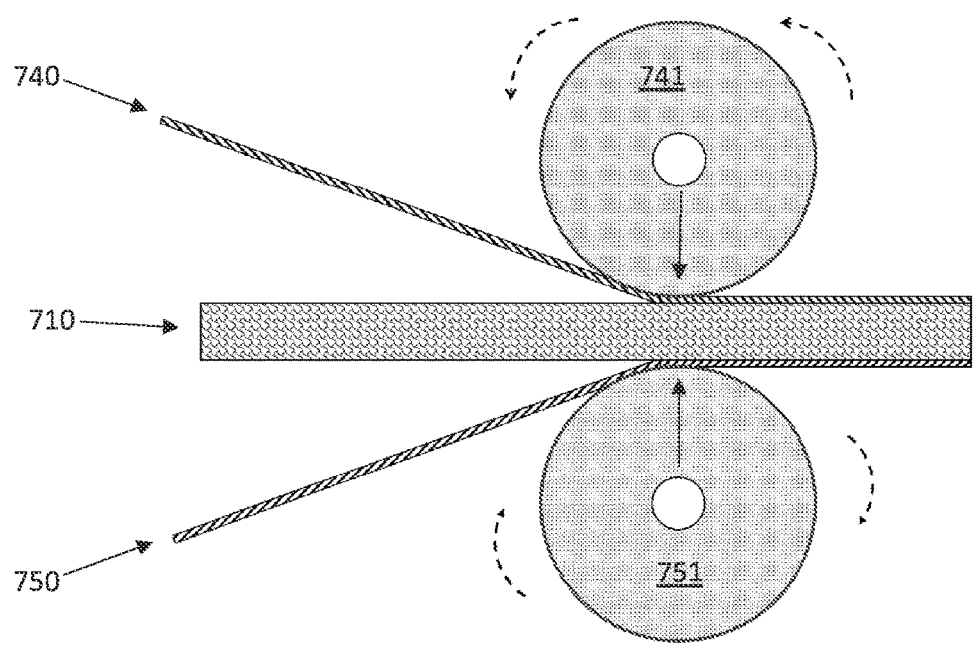
FIG. 13 is a schematic side view illustrating a structural member during formation of a sandwich panel being consolidated by lamination rollers. The skins may be preheated and the rollers may be temperature-controlled.

In the FIG. 13 embodiment, inward pressure toward one another (note arrow directions) is applied by rollers 741 and 751 that may be temperature-controlled to skins 740 and 750 that are preheated and then applied to a core 710 in a continuous or semi-continuous lamination process. In either batch or continuous processing, multiple pieces of core material may be spliced together to form an essentially uninterrupted core. The core sections may be attached together by some method such as welding, bonding, or some other form of joining. The core sections may also be placed in contact with one another without being attached to one another, allowing the skins to hold the spliced core sections together after fabrication of the completed structural member. The thermoplastic functional components of the crosslinking nanolayer applied to the core 710 interact with the molecular chains of the thermoplastic skins 740 and 750 at the interface where the nanolayer has been applied. The heat and pressure enable molecular entanglement of the nanolayer within the bulk thermoplastic of the skins 740 and 750. Pressure is held until the structural member is cool enough that it will not warp or distort when the pressure is removed.

In the embodiments described herein, when each of the skins solidifies with the nanolayer molecularly entangled within the surface of the skin which it contacts, the interface between the skin and the nanolayer fuses in a way that renders the two components indistinguishable and inseparable along the surfaces that were joined, so the components cannot be restored to their previous individual states. Because the crosslinking component of the nanolayer has already covalently bonded to the core, the skin and the core are now effectively covalently bonded together.

Figure 14:
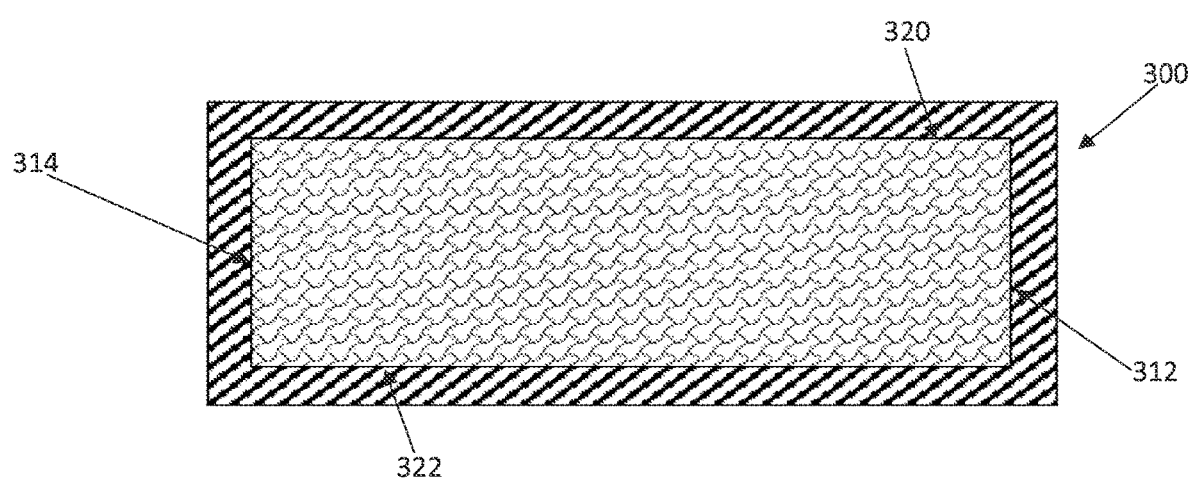
FIG. 14 is a side view illustrating an assembled structural member that results from the components shown during assembly in FIG. 8.

FIG. 14 is an illustration of the resulting structural member created from the components shown in FIG. 8. The structural member 300 is a sandwich panel or board profile with two opposing major surfaces 320 and 322 enclosed, and at least two fully enclosed opposing smaller edges 312 and 314. The enclosed edges offer several advantages compared to a structural panel with exposed foam at the edges. Some advantages are performance improvements including delamination resistance after impact or edge damage. Enclosed edges may also provide resistance against moisture penetration, as well as mechanical performance enhancement in flexural strength and stiffness, such as when the member 300 has a load applied to it, including without limitation a bending, torsion, tension, compression or any combination of loads. A structural member, as defined herein, is a member that has a primary purpose during its anticipated use of bearing a substantial load, such as one or more of the preceding types of loads, while resisting deformation under the load. The composite structural member provides mechanical benefits in excess of each of its individual components, and in substantial excess of the sum of the individual, separate components. In addition to performance improvements, the enclosed edges also provide an aesthetic value by providing a continuous finish surface to the external part.

Figure 15:
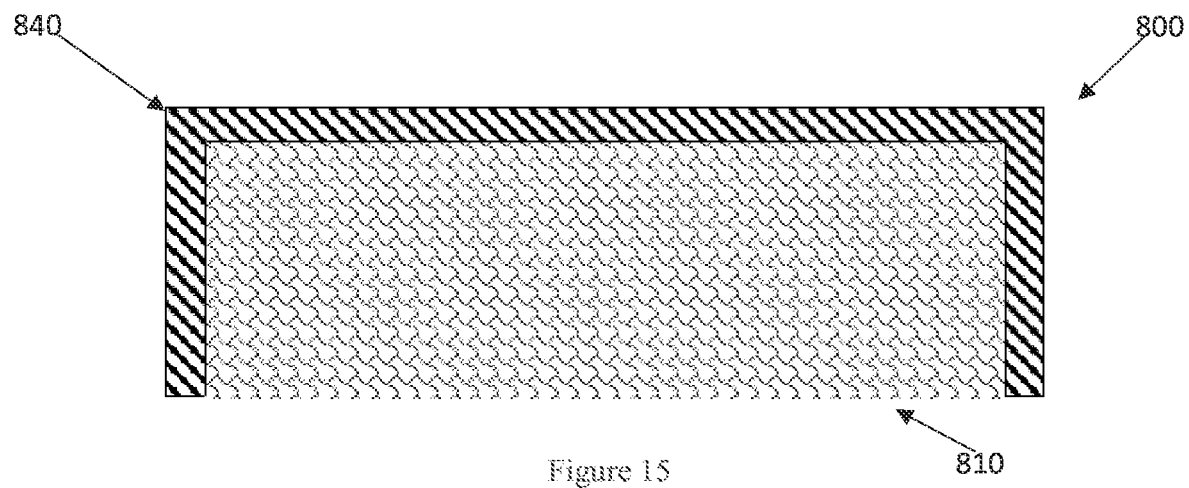
FIG. 15 is a side view illustrating a structural member formed by a skin partially encapsulating a core to which the crosslinking nanolayer has been applied.
Figure 16:
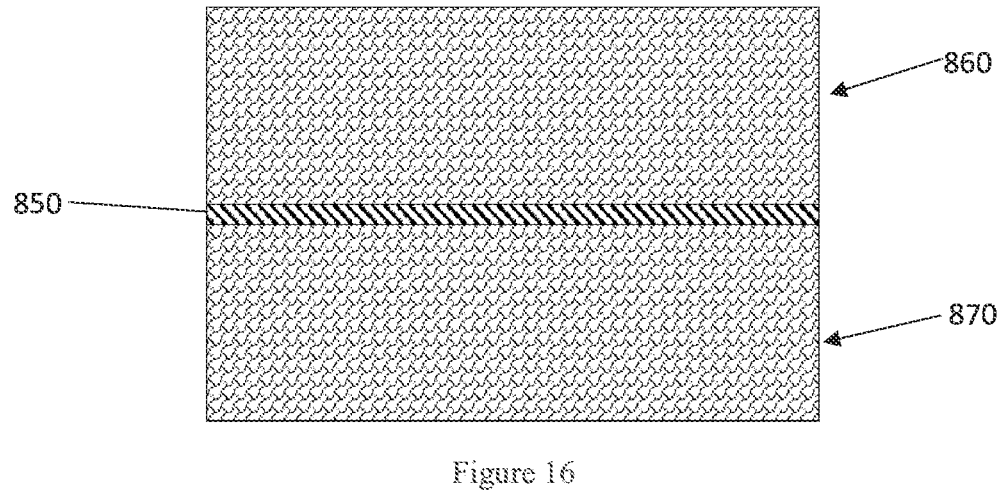
FIG. 16 is a schematic side view illustrating a skin with two cores attached to opposing sides.

FIG. 15 illustrates a structural member 800 formed by a skin 840 attached to a single core 810 that is uninterrupted across the bonded area. The core 810 itself includes the surface discontinuities previously discussed, but the overall core structure is uninterrupted and homogeneous at the macro level. The crosslinking nanolayer is applied prior to attachment of the skin to the core 810 on at least the surface(s) where the skin 840 will be attached to the core 810. The core edges can be enclosed on one or more sides as shown in FIG. 15 by the skin 840. In the FIG. 15 embodiment, the crosslinking nanolayer is applied to at least all surfaces of the core 810 where the skin 840 will be attached. In another embodiment, the sides may not be enclosed. In another embodiment, illustrated in FIG. 16, a skin 850 has a core 860 attached to a first side, and a second core 870 may be attached to a second, opposite side of the skin 850.

Figure 17:
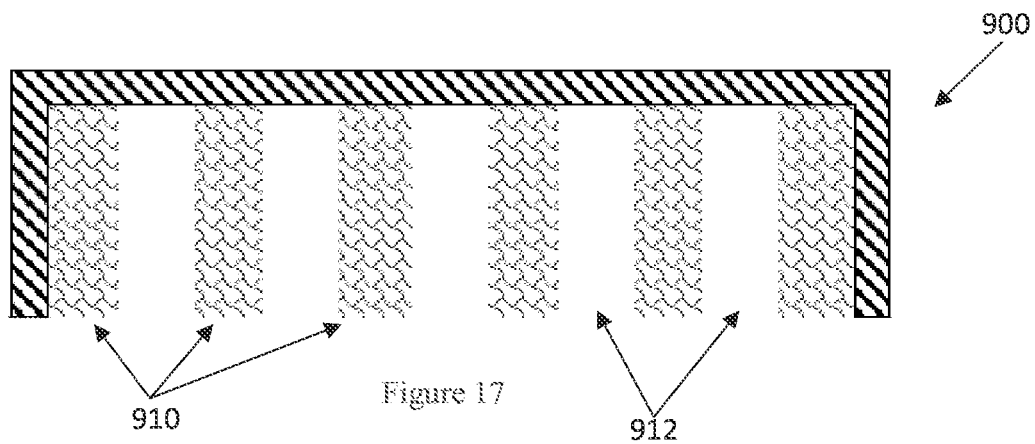
FIG. 17 is a side view illustrating a structural member including a skin material partially enclosing core material sections serving as stiffening ribs.

In another embodiment, the core of the structural member may not be one individual, uninterrupted piece of core material as shown in FIGS. 14 and 15, but instead, as illustrated in FIG. 17, the core consists of multiple spaced pieces 910 of material separated by gaps 912 or voids. The structural member 900 of FIG. 17 is even lighter than if the core was a single, uninterrupted piece as shown in FIGS. 14 and 15. In other, similar embodiments, sections of core material may be removed from an uninterrupted core as in FIGS. 14 and 15 to create holes or gaps in the core and to form circular, crosshatched, or some other cutout pattern of core to which the skins are attached. The edges and/or opposing side of the structural member 900 may be enclosed to increase stability of the resulting structural member, but enclosed edges and/or sides are not necessary. FIG. 17 shows no bottom skin on the opposing side, but in other embodiments, a bottom skin may also be included. The crosslinking nanolayer may be applied to at least the core surfaces that will be in contact with the skin material.

In another embodiment, the core may comprise two or more dissimilar core materials of differing density, composition, or some other property. In similar embodiments, sections of core material may be removed to create vertical or other oriented holes in the core to form circular, crosshatched, or some other pattern of core to which the skins are attached. The crosslinking nanolayer may be applied to at least the core surfaces that will be in contact with the skin material.

In another embodiment, the skin may have a higher melting temperature than the core. In this case the crosslinking nanolayer may be applied to the skin side of the interface prior to joining the core and skin. In another embodiment, the core may comprise two or more dissimilar core materials of differing density, composition, or some other property.

Figure 18:
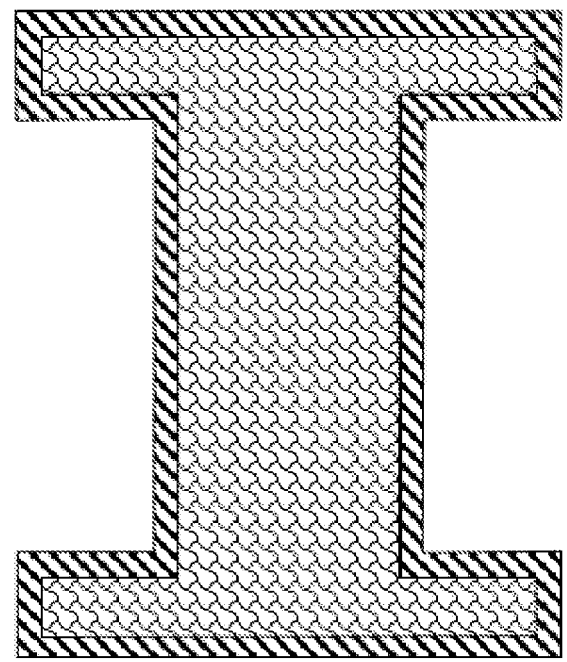
FIG. 18 is an end view illustrating a structural member that has the profile shape of an I-beam. The skin material fully encloses the foam core material to which the crosslinking nanolayer has been applied.
Figure 19:
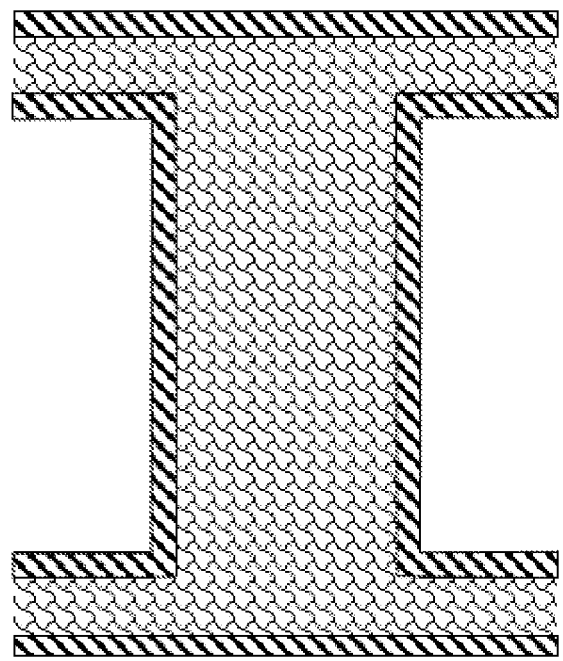
FIG. 19 is an end view illustrating a structural member that has the profile shape of an I-beam. The skin material partially encloses the foam core material to which the crosslinking nanolayer has been applied.
Figure 20:
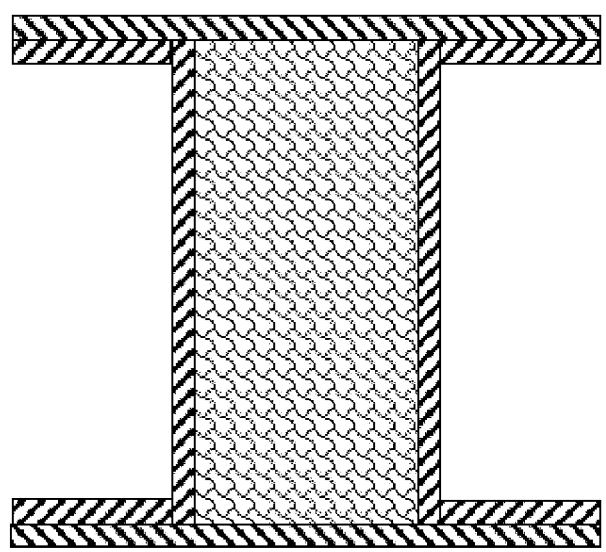
FIG. 20 is an end view illustrating a structural member that has the profile shape of a modified I-beam. The skin material fully encloses the foam core material to which the crosslinking nanolayer has been applied, however the foam is not present in the flanges of the profile.

In another embodiment, the structural member may be in the shape of an I-beam or H-beam profile including a core, at least one skin, and a crosslinking nanolayer. FIGS. 18-20 illustrate embodiments that are in the shape of an I-beam or an H-beam profile. The skins of the I-beam structure may fully enclose a core profile that matches the shape of the overall profile of the structure, as illustrated in FIG. 18. The fully enclosed I-beam structure offers similar benefits in this structure profile as explained previously in association with the description of the FIG. 14 embodiment. However, the I-beam structural member may be only partially enclosed by the skin material, as illustrated in FIG. 19. In another embodiment, the core of the I-beam profile may be a profile shape that does not necessarily match the overall shape of the I-beam profile, as illustrated in FIG. 20. This embodiment does not require complicated machining or molding of the core material prior to application of the crosslinking nanolayer, but may still provide the benefits of an I-beam profile structural member, such as efficient performance in managing bending and shear loads.

Figure 21:
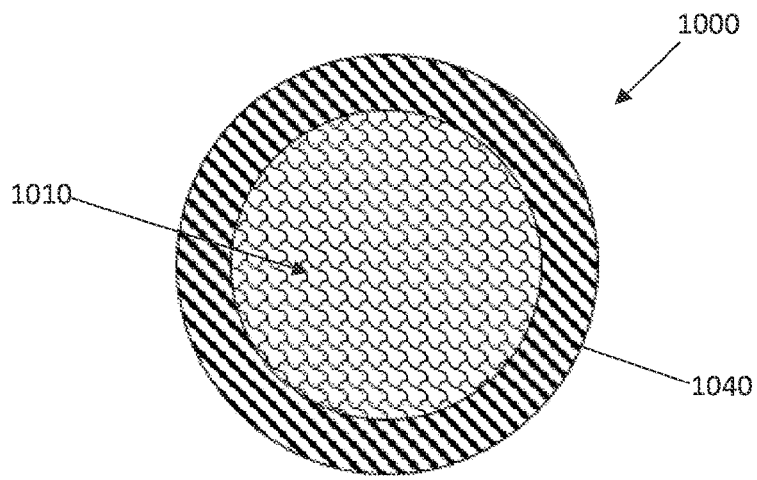
FIG. 21 is an end view illustrating a structural member that is a rod and has the profile shape of a circle. The skin material forms an annulus and fully encloses the cylindrical foam core material to which the crosslinking nanolayer has been applied.

In another embodiment, the structural member 1000 may be a circular profile consisting of a core 1010, skin 1040, and a crosslinking nanolayer (not visible but applied as described herein) as illustrated schematically in section in FIG. 21. As in previous examples, the crosslinking nanolayer is applied to at least the surfaces of the core 1010 where the skin 1040 will be attached. In this embodiment, the skin 1040 fully encloses the core material, except optionally for the ends, forming an annulus around the core 1010. In this embodiment, the resulting structural member 1000 is a circular rod profile. In other contemplated embodiments, the profile may be an oval, square, rectangle, trapezoid, polygon, irregular or some combination of geometric shapes. The profile may be fully enclosed by the skin material. The core cross section may be hollow or include internal voids. In other embodiments, the skin may only partially enclose the core.

In another embodiment, the structural member of this invention may be a structure comprising a core, a skin, and a crosslinking nanolayer. The structural member is fabricated and may be subsequently reheated and reformed to a different shape.

Figure 22:
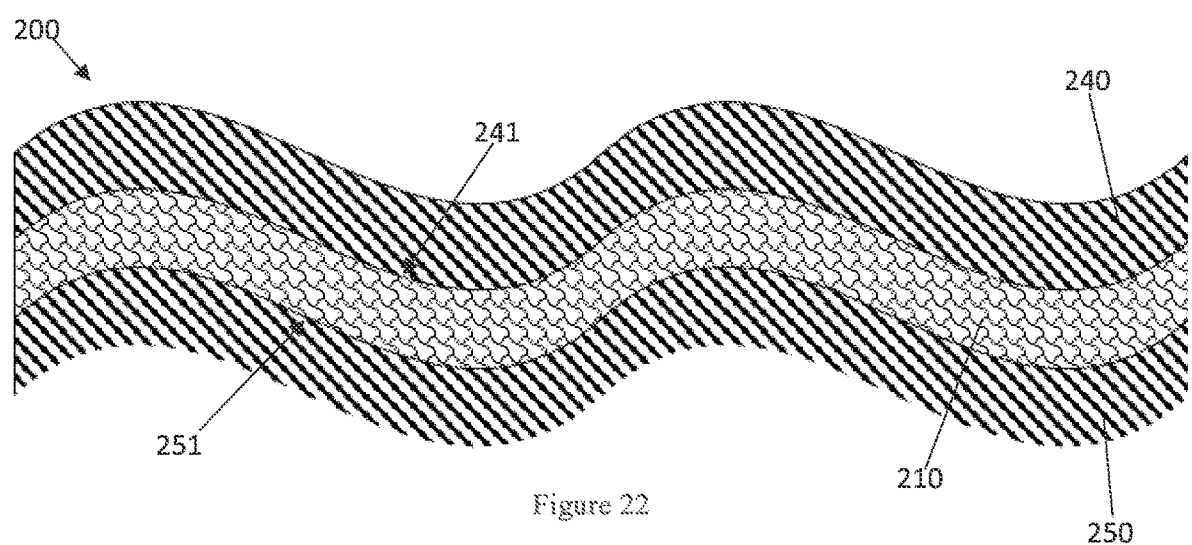
FIG. 22 is an end view illustrating an assembled structural member resulting from the components shown in FIG. 6 that has been subsequently thermoformed into a 3-dimensional, non-planar shape.

In one embodiment illustrated in FIG. 22, the structural member 200 may be a sandwich panel including the components shown in FIG. 7. The sandwich panel may be reheated, once joined together, to a similar temperature at which it was fabricated, such that the skins 240 and 250 are melted and the core 210 is flexible but not melted. The sandwich panel may be placed in a die, mold, or other forming mechanism to be forced into a new shape as shown for the structural member 200 in FIG. 22. When the structural member 200 is cooled, the shape shown in FIG. 22 is retained. The crosslinking nanolayer remains covalently bonded to the opposing major surfaces 241 and 251 of the core 210, and while its molecular entanglement with the skins 240 and 250 may be rearranged by the forming process, it will reestablish itself under the forming pressure, prior to solidifying. The benefits of the crosslinking nanolayer will be maintained after the thermoforming has occurred. In another embodiment, the initial structural member may be a single skin attached to a single core. In other embodiments, the structural member that is thermoformed may be any of the other structural member embodiments mentioned or suggested herein.

The following steps describe the general process of creating the structural member of this invention:

A crosslinking nanolayer comprising a reactive component and a thermoplastic functional component is combined in a dispersion. The amount of reactive component included in the dispersion is in excess of the amount of the thermoplastic functional component in a reactive equivalent ratio that may be approximately 2:1. The dispersion containing the crosslinking nanolayer is applied to all surfaces of the core material that will be in contact with the one or more skins. This may be accomplished using any conventional means of applying a liquid to a solid, such as a sprayer, roller, immersion or any other suitable means. The crosslinking nanolayer is dried on the substrate core surfaces, which may be achieved by simply exposing the substrate core surfaces to air at ambient temperature, but may include elevating the temperature, moving air rapidly over the surface, or any other means of drying.

The now-coated core is heated to crosslink the available reactive component of the crosslinking nanolayer with the core surfaces, covalently bonding the nanolayer to the surfaces of the core the nanolayer contacts. The surface of the core is now functionalized with the thermoplastic functional component of the nanolayer covalently bonded to its surface. The surface of the core thus has an altered surface energy and is now molecularly compatible with the skin material to be applied subsequently.

One or more thermoplastic skins that are designed to cover corresponding surfaces of the core are heated to a temperature above the melting temperature of the skin material but below the melting temperature of the core material. This may be accomplished by placing the skins and core in contact with one another in an oven, heated press, or laminator. Alternatively, the components may be heated separately or by other means, such as by exposing the skins and core to heated air, radiant energy or a hot surface.

When the skin has melted, which desirably merely softens the thermoplastic, rather than reducing the skin to a pool of highly fluent liquid, the assembly of the core and the skin or skins is removed from the oven and placed in a platen press. The press consolidates the molten skins and the core surfaces that have been functionalized by the crosslinking nanolayer, by pressing the skins substantially perpendicular to the planes of the skins toward the core. The pressure facilitates molecular entanglement between the thermoplastic functional component of the nanolayer on the core surface(s) and the molecular chains of the melted thermoplastic skins.

The assembly is allowed to cool under pressure until all molten skin material has fully solidified. The thermoplastic functional components of the crosslinking nanolayer covalently bonded to the core surfaces are now molecularly entangled with, and indistinguishably incorporated into, the molecular chains of the thermoplastic skins. The skins of the resulting structural member are effectively covalently bonded to the core, which is not possible with conventional basic lamination method of making the same panel. The resulting failure mode of a flexural test has been found to be a preferred through-thickness fracture of the core rather than a skin delamination. Thus, when the structural member formed as described herein may be exposed to a mechanical load, which may be torsion, bending, tension, compression or some combination, the structural member supports the load and resists deformation. A composite structural member made of a core and skin construction, such as a sandwich panel, is synergistic in that the combined structure provides mechanical benefits in excess of each of its individual components.

Example 1. In the example a structural member is an injection molded part consisting of a PA66 threaded insert overmolded with PP. The PA66 threaded insert core has a melt temperature of approximately 270° C. and is premolded in a separate process. An aqueous dispersion consisting of a reactive component that is an oxazoline functional acrylic polymer and a thermoplastic functional component that is a maleic anhydride modified PP emulsion is applied to the insert core surfaces and allowed to dry. The dispersion will form a crosslinking nanolayer and will lower the surface energy and establish molecular PP chain sites that entangle with the injected PP material at the molecular level.

The coated PA66 inserts are placed in the cavity of an injection molding machine and melted PP at approximately 220° C. is injected into the cavity, surrounding and capturing the inserts. The PP-functional surface of the coated inserts entangles with the molecules of the melted PP injected into the cavity, thereby fusing the insert and PP surfaces together at the molecular level. The part is allowed to cool in the press until it has solidified into the completed structural member.

In another example, the structural member may be a sandwich panel comprising a polyamide 66 (PA66) honeycomb core and glass-reinforced PP skins attached to opposing major core surfaces, which may be on the top and bottom in some orientations. In this embodiment the polymer core may have a density of approximately 0.1 g/cm$^3$ and cell diameter of 3 millimeters. The melting temperature of a PA66 honeycomb material is approximately 270° C. The opposing major core surfaces of the honeycomb are discontinuous and have approximately 8% of the overall core area available to contact the skin and establish a bond. A crosslinking nanolayer is applied to the opposing major core honeycomb surfaces and allowed to dry. The nanolayer may consist of reactive component, which may be an oxazoline-functional acrylic polymer in an aqueous dispersion, and a thermoplastic functional component, which may be a maleic anhydride modified PP emulsion. The thermoplastic functional component lowers the surface energy of the discontinuous surface of the honeycomb core surfaces and establishes molecular PP chains that entangle at the molecular level with the polymer chains of a glass-reinforced polypropylene skin material. The PP skins have a melting point of approximately 160° C. The panel is assembled with the skins adjacent the opposing major core surfaces and externally heated at a temperature of 200° C., such that the PP skins melt but the PA66 core material remains solid and rigid. Pressure is applied to compress the skins against the opposing major core surfaces, and the PP-functional surface of the core entangles with the molecules of the melted PP skin, fusing the skin and core together at the molecular level. The panel is allowed to cool until the skins have solidified.

Example 2. The structural member may be a sandwich panel comprising a polycarbonate (PC) honeycomb core and a glass-reinforced low density polyethylene (LDPE) skin attached to the top and bottom major surfaces. In this embodiment the polymer core may be a PC honeycomb having a density of approximately 0.08 g/cm$^3$ and cell diameter of 3.2 millimeters. The softening temperature of the PC honeycomb material is approximately 150° C. The surface of the honeycomb is discontinuous such that approximately 7% of the overall core area is available to contact the skin and establish a bond. A crosslinking nanolayer is applied to the honeycomb and allowed to dry. The nanolayer may consist of reactive component, which may be an oxazoline-functional acrylic polymer in an aqueous dispersion and a thermoplastic functional component, which may be an oxidized polyethylene (PE) emulsion. The thermoplastic functional component lowers the surface energy of the discontinuous surface of the honeycomb core and establishes molecular PE chains that entangle with the polymer chains of the glass-reinforced LDPE skin material at the molecular level. The LDPE skins have a melting point of approximately 120° C. The panel is assembled and externally heated at a temperature of 140° C., such that the LDPE skins melt but the PC core material remains solid and rigid. Pressure is applied, and the PE-functional surface of the core entangles with the molecules of the melted LDPE skin, fusing the skin and core together at the molecular level. The panel is allowed to cool until the skins have solidified.

Example 3. In the example of a structural member that is a sandwich panel, the thermoplastic core is a closed cell PET foam with a density of 0.15 g/cm$^3$ and melt temperature of 260° C. The surface of the foam is discontinuous with approximately 11% of the overall foam area available to contact a skin and establish a bond. An aqueous dispersion is applied to the foam core surfaces and allowed to dry in the open air for a period of about 24 hours. The dispersion consists of a reactive component that is an oxazoline functional acrylic polymer and a thermoplastic functional component that is a maleic anhydride modified polypropylene (PP) emulsion. The dispersion will form a crosslinking nanolayer and will lower the surface energy and establish molecular PP chain sites that entangle with the glass-reinforced polypropylene skin material at the molecular level.

The PP skins have a melting point of approximately 160° C. The components are assembled and externally heated to a temperature of 200° C., such that the PP skins melt and soften but the PET core material remains solid. The PP-functional surface of the coated core surfaces entangles with the molecules of the melted PP skins when the components are in contact at this temperature, thereby fusing the skins and core surfaces together at the molecular level. Pressure is applied to the skins toward the core and the combined structure is allowed to cool until the skins have solidified into the completed structural member.

Despite only approximately 11% of the core surface being in contact at the interface with the skin(s), the resulting structural sandwich panel fabricated with the coating achieves a 50% increase in ultimate flexural strength and 40% increase in strain at failure when compared to the same structure fabricated without application of the nanolayer coating to the core. Also, with the addition of the crosslinking nanolayer, the failure mode of the ASTM D7249 flexural test specimens changes from an undesirable skin-to-core delamination to a preferred through-thickness fracture of the core. Additional structural properties including impact strength, flatwise tensile strength, shear strength, and others may also be increased based on the unexpected flexural strength improvement.

This detailed description in connection with the drawings is intended principally as a description of the presently preferred embodiments of the invention, and is not intended to represent the only forms in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A composite structural member configured for bearing a load, the member comprising:
   a. a polymer core having at least first and second opposing surfaces;
   b. a polymer skin attached to at least the first core surface, wherein the skin is dissimilar in chemical composition from the core; and
   c. a crosslinking nanolayer, including at least a reactive component and a functional molecular compatibility component, interposed between the skin and the core, wherein the reactive component is covalently bonded to at least the first core surface and the functional molecular compatibility component, and the functional molecular compatibility component molecularly fuses with the skin.

2. The structural member in accordance with claim 1, wherein voids are formed in at least a portion of the core.

3. The structural member in accordance with claim 2, wherein the polymer core is at least partially a foam.

4. The structural member in accordance with claim 3, wherein the first core surface is continuous.

5. The structural member in accordance with claim 3, wherein the first core surface is discontinuous.

6. The structural member in accordance with claim 1, wherein the polymer core is a honeycomb structure.

7. The structural member in accordance with claim 6, wherein the first core surface is continuous.

8. The structural member in accordance with claim 6, wherein the first core surface is discontinuous.

9. The structural member in accordance with claim 1, wherein the skin is reinforced with organic or inorganic structures.

10. The structural member in accordance with claim 1, wherein the skin is multilayered.

11. The structural member in accordance with claim 1, wherein the reactive component is selected from the group of epoxy, isocyanate, carbodiimide, melamine, oxazoline, silane, siloxane, or silsesquioxane functional polymer.

12. The structural member in accordance with claim 11, wherein the reactive component is an oxazoline functional acrylic polymer in an aqueous dispersion.

13. The structural member in accordance with claim 1, wherein the functional molecular compatibility component is an oxidized short chain polymer, copolymer or oligomer.

14. The structural member in accordance with claim 13, wherein the structural member is a sandwich panel.

15. The structural member in accordance with claim 14, wherein the structural member is a sandwich panel with at least one edge that is at least partially enclosed.

16. The structural member in accordance with claim 1, wherein the structural member is a rod.

17. The structural member in accordance with claim 1, wherein the structural member is an I-beam.

18. The structural member in accordance with claim 1, wherein the structural member has a non-uniform cross-section, such as an airfoil.

* * * * *